United States Patent [19]

Watanabe

[11] Patent Number: 4,781,505

[45] Date of Patent: Nov. 1, 1988

[54] SCREW EQUIPPED WITH LOCKING MEANS

[75] Inventor: Hisaya Watanabe, Yokohama, Japan

[73] Assignees: Showa Denko Kabushiki Kaisha; Hiroaki Watanabe, Kanagawa, Japan

[21] Appl. No.: 888,651

[22] PCT Filed: Nov. 6, 1985

[86] PCT No.: PCT/JP85/00618

§ 371 Date: Sep. 3, 1986

§ 102(e) Date: Sep. 3, 1986

[87] PCT Pub. No.: WO86/02980

PCT Pub. Date: May 22, 1986

[30] Foreign Application Priority Data

Nov. 6, 1984 [JP] Japan .................. 59-232497

[51] Int. Cl.$^4$ ............................................. F16B 39/22
[52] U.S. Cl. ................................. 411/301; 411/324; 411/335; 411/427
[58] Field of Search ............... 411/301, 182, 276, 285, 411/290, 302, 324, 334, 335, 427, 429, 176

[56] References Cited

U.S. PATENT DOCUMENTS

| | | | |
|---|---|---|---|
| 2,201,087 | 5/1940 | Hallowell | 411/168 |
| 2,210,455 | 8/1940 | Hosking | 411/187 |
| 2,235,435 | 3/1941 | Koester | 411/168 |
| 3,001,567 | 9/1961 | Brill | 411/301 X |
| 3,030,997 | 4/1962 | Collins | 411/260 X |
| 3,079,830 | 3/1963 | Faroni | 411/427 |
| 3,265,107 | 8/1966 | Glicksman | 411/301 |
| 3,286,754 | 11/1966 | Klooz | 411/176 |
| 4,498,826 | 2/1985 | Simmonds | 411/301 |

FOREIGN PATENT DOCUMENTS

| | | | |
|---|---|---|---|
| 704899 | 4/1941 | Fed. Rep. of Germany | 411/427 |
| 1168170 | 4/1964 | Fed. Rep. of Germany | 411/176 |
| 744172 | 1/1933 | France | 411/429 |
| 52-1959 | 1/1977 | Japan | 411/427 |
| 52-131564 | 10/1977 | Japan | 411/427 |

*Primary Examiner*—Gary L. Smith
*Assistant Examiner*—Rodney M. Lindsey
*Attorney, Agent, or Firm*—Sughrue, Mion, Zinn, Macpeak & Seas

[57] ABSTRACT

A screw equipped with locking means, includes a female thread made of a synthetic resin and a male thread made of a metal, or a female thread made of a synthetic resin and a male thread made of a synthetic resin, fitted with each other, the female thread having a double cylindrical boss portion formed at the center thereof so that the male thread may be fitted into the innerside boss portion and the thread portion of the boss may be deformed more or less when pressed against the shaft of the male thread in the direction perpendicular thereto through the resilience of the synthetic resin, which is the material of the female thread, by pressing the terminal end of the innerside boss portion against the flange portion of the male thread or a member to be fixed at the final stage of clamping the screw. A female threaded nut may have a blind bore with a projection at the bottom for engagement and deformation by a cutter on the end of a bolt.

2 Claims, 2 Drawing Sheets

SCREW EQUIPPED WITH LOCKING MEANS

BACKGROUND OF THE INVENTION

This invention relates to a screw equipped with a locking means, more particularly to a screw equipped with a locking means which not only can prevent the screw from being loosened by, for example, vibration or shock, but also will enable a shortening of the assembly steps by obviating such work as the insertion of a packing or spring washer, or the injection of an adhesive for the prevention of looseness, simultaneously with realizing a saving of the parts to be used.

A conventional screw, as can be seen from the sectional view shown in FIG. 1 (A), has a means for preventing looseness which clamps a member to be fixed, for example, a plate 3, with a bolt 1 and a nut 2 with a packing or spring washer 4 interposed therebetween. Also, as a means of enabling a more complete fixing, an adhesive has been injected at the fitting portion 5 between the bolt 1 and the nut 2 (the sectional view shown in FIG. 1 (B) shows an example of an anchor bolt).

However, according to such a prior art method, a separate material such as a spring washer or adhesive is required and the step of mounting the spring washer 4 or injecting adhesive is required. Further, the adhesive force of the adhesive will be inevitably lowered by change over a period of time. When the screw is to be repeatedly detached, it is impossible to use an adhesive and further, the function of the spring washer 4 will be inevitably degraded, or abrasion will occur after repeated use. Such problems will occur more markedly when the material of the screw consists of different substances.

SUMMARY OF THE INVENTION

Accordingly, an object of the present invention is to provide a screw equipped with a locking means which prevents looseness of the screw as mentioned above and also obviates the use of a spring washer or an adhesive.

More specifically, in accordance with the present invention, there is provided a screw equipped with a locking means, comprising a female thread made of a synthetic resin and a male thread made of a metal, or a female thread made of a synthetic resin and a male thread made of a synthetic resin, fitted with each other, the female thread having a double cylindrical boss portion formed at the center thereof so that the male thread may be fitted into the innerside boss portion and the thread portion of the boss may be deformed more or less and pressed against the shaft of the male thread in the direction perpendicular thereto through the resilience of the synthetic resin, which is the material of the female thread, by pressure on the terminal end of the innerside boss portion from the flange portion of the male thread or a member to be fixed at the final stage of clamping the screw.

EXPLANATION OF THE DRAWINGS

The present invention is described in detail below with reference to the drawings, in which.

DESCRIPTION OF PREFERRED EMBODIMENTS OF THE INVENTION

First, an embodiment 1 of the screw equipped with a locking means according to the present invention is described with reference to FIGS. 2 (A) and (B).

Figure 1A:
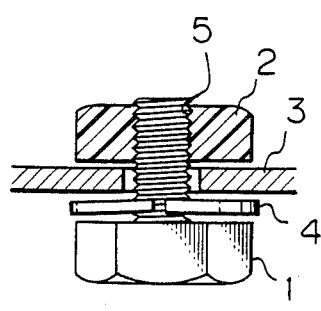
FIGS. 1 (A) and (B) are sectional views showing the screw of the prior art, as described above.
Figure 1B:
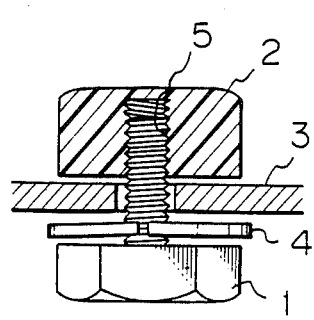
Figure 2A:
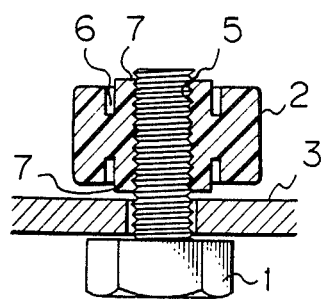
FIGS. 2 (A) and (B) and FIGS. 3 (A) and (B) are sectional views showing embodiments of the present invention, in which FIGS. 2 (A) and (B) show the screw constitution of a through-type nut and bolt, and FIGS. 3 (A) and (B) the screw constitution of an anchor-type bolt and nut
Figure 2B:
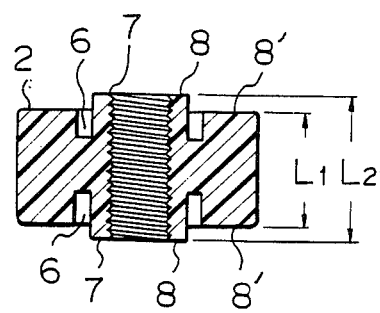

FIG. 2 (A) shows a screw consisting of a male threaded member 1 made of a metal or a synthetic resin (hereinafter called "bolt"), a female threaded member 2 made of a synthetic resin (hereinafter called "nut") fitted therewith, and a member 3 to be fixed.

The nut 2 has a double cylindrical boss portion 7 having a threaded bore 5 at the center, and a groove 6 is provided between the boss portion and the nut body.

FIG. 2 (B) shows details of the nut, the constitution of which is such that the thickness $L_2$ between the screw ends of the end portions 8 of the double cylindrical boss and the thickness $L_1$ between the screw ends of the end faces 8' of the nut body may have the relationship $L_2 > L_1$.

When a screw having such a constitution is used, at the final stage of clamping the screw, first the end face 8 comes into contact with the member to be fixed 3 and, as clamping is further continued, the double cylindrical boss portion 7 is pressed as a whole by the member to be fixed, and is deformed by expansion toward the groove 6 side and the threaded bore 5 side to finally clamp the nut 1 and the member 3 to be fixed, thus functioning to prevent a loosening of the screw through resilience of the synthetic resin.

Next, another embodiment 2 of the screw equipped with a locking means according to the present invention is described with reference to FIGS. 3 (A) and (B).

Figure 3A:
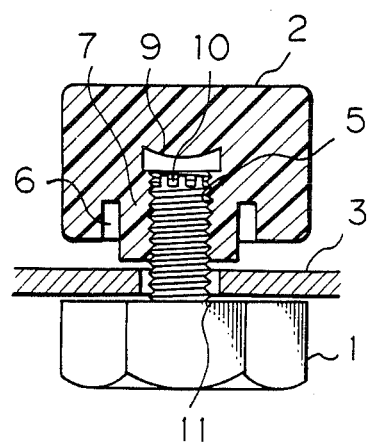
Figure 3B:
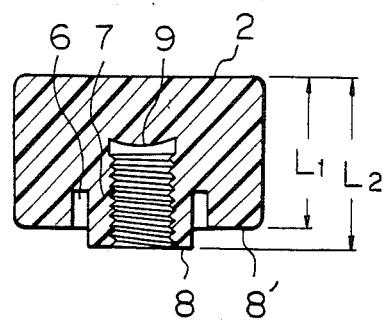
Figure 4A:
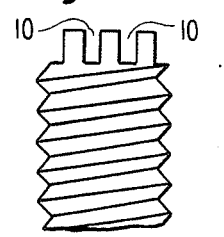
FIG. 4A is a partial side elevational view of a bolt having cutting means on the end thereof and FIG. 4B is an end view thereof.
Figure 4B:
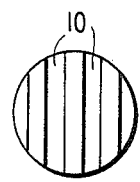

FIG. 3 (A) shows an anchor-type screw consisting of a bolt 1 made of a metal or a synthetic resin, a nut 2 made of a synthetic resin fitted therewith and a member 3 to be fixed. The nut 2 has a cylindrical boss portion 7 having a threaded bore 5 at the center, as in the embodiment 1 as described above, and a groove-6 is provided between the boss portion and the nut body. FIG. 3(B) shows details of the anchor-type nut, in which the end face 8 of the double cylindrical boss portion 7 and the end face 8' of the nut body are constituted so that the relationship therebetween may be $L_2 > L_1$, as in the case of the embodiment 1 as described above. With such a screw constitution, entirely the same effect of looseness prevention is produced as in the case of the screw of the embodiment 1.

In the case of an anchor screw, there may not be a member 3 to be fixed. In this case, for further promoting the effect of looseness prevention, a convex portion 9 is provided at the bottom of the threaded bore of the nut and a cutting 10 is provided at the tip end of the bolt 1 so as to come into contact with the above convex portion 9, whereby a further looseness prevention effect can be exhibited through the resilience possessed by the synthetic resin.

On the other, hand, when there is no member 3 to be fixed, instead of providing the difference between the end faces 8 and 8', a convex portion can be provided at the boundary 11 between the flange and the threaded portion of the bolt 1 so that the convex portion may press on the cylindrical boss 7.

When employing synthetic resins for both the bolt 1 and the nut 2, first, the material of the bolt 1 desirably should be one which is relatively rigid and is little deformed by pressure, while the material of the nut 2, which has a relatively enriched resilience, has the property of being deformable by pressure and returning quickly again to the original form after removal of the pressure. For example, by using the same resin, the bolt 1 can be made of a resin reinforced with carbon fibers or glass fibers, and the nut 2 made of a non-reinforced resin.

Although the above preferred embodiments of the present invention are described with reference to FIGS. 2 (A) and (B) and FIGS. 3 (A) and (B), the scope of the present invention is, of course, not intended to be limited to these embodiments.

I claim:

1. A screw and nut assembly having locking means comprising a nut of synthetic resin material having an internally threaded cylindrical blind bore with a convex bottom portion the bottom portion comprised of said synthetic resin and a screw member of a material having a greater degree of rigidity than the material of said nut member, said screw member having cutting means on the end thereof whereby upon engagement of said cutting means on said screw with said convex bottom portion of said bore, said convex bottom portion will be deformed to prevent looseness of the screw and nut assembly.

2. A screw and nut assembly as set forth in claim 1, wherein a cylindrical boss portion is provided on at least one end of said nut member with said threaded bore extending therethrough and a groove is provided about said boss portion in the end of said nut member whereby upon tightening of said nut member against a rigid member, said boss portion will be deformed so as to be pressed against the screw member in a direction perpendicular thereto through the resilience of the synthetic resin material of the nut member.

* * * * *